United States Patent [19]

Stillman

[11] 4,216,268
[45] *Aug. 5, 1980

[54] BALANCED ORIENTED FLEXIBLE PACKAGING COMPOSITE

[75] Inventor: Nathan Stillman, Walnut Creek, Calif.

[73] Assignee: Champion International Corporation, Stamford, Conn.

[ * ] Notice: The portion of the term of this patent subsequent to Apr. 18, 1995, has been disclaimed.

[21] Appl. No.: 897,371

[22] Filed: Apr. 18, 1978

Related U.S. Application Data

[62] Division of Ser. No. 656,863, Feb. 10, 1976, Pat. No. 4,085,244.

[51] Int. Cl.$^2$ .............................................. B32B 27/40
[52] U.S. Cl. ................................ 428/424.8; 428/192; 428/425.8; 428/461; 428/458; 428/516; 428/520; 428/910
[58] Field of Search ................. 428/192, 194, 35, 424, 428/425, 458, 516, 461, 910, 520

[56] References Cited

U.S. PATENT DOCUMENTS

| | | | |
|---|---|---|---|
| 3,794,547 | 2/1974 | Kuga et al. | 428/910 X |
| 3,837,517 | 9/1974 | Held, Jr. | 428/35 X |
| 3,912,843 | 10/1975 | Brazier | 428/910 X |
| 4,085,244 | 4/1978 | Stillman | 428/192 |

Primary Examiner—P. C. Ives
Attorney, Agent, or Firm—Evelyn M. Sommer

[57] ABSTRACT

A laminated packaging film is disclosed. This film composed, in order, of an outer layer of balanced biaxially-oriented polyamide, a flexible metal foil, a layer of balanced biaxially-oriented polypropylene and an inner layer of heat-sealable polyolefin - is readily produced and yields an exceptionally strong and flex-resistant laminate useful inter alia for the production of pouches and like, liquid containers of large volume.

6 Claims, 4 Drawing Figures

BALANCED ORIENTED FLEXIBLE PACKAGING COMPOSITE

This is a division of application Ser. No. 656,863 filed Feb. 10, 1976, which issued on Apr. 18, 1978, as U.S. Pat. No. 4,085,244.

INTRODUCTION TO THE INVENTION

An object of this invention is the production of self-sealing, packaging film laminate of high strength.

Another object of this invention is the provision of the various layers of the composite packaging film in a sequence which provides maximum interlayer cooperation while simplifying the manufacture of the film.

A further object of this invention is the production of thin packaging film of exceptionally high flex-resistance, useful as containers for large volumes of liquid materials.

A particular object of this invention is the provision of a flexible, packaging film which can be self-sealed into pouches which, while easily transported in essentially flat, compressed form, are capable of retaining 5 to 20 or more liters of liquid contents without succumbing to the physical stress due to movement or shift of liquid contents within a container during transit and use.

These, and other objects of the invention as are described hereinafter, are obtained through the present invention.

DESCRIPTION OF THE INVENTION

This invention relates to the production of a laminate or composite packaging film of highly improved properties.

It has long been sought to produce a laminated film which will be useful in a pouch or like packaging construction for the transport and storage of liquids. Although cans and other containers of fixed dimensions have long been employed for use with large volumes of ketchup, syrup and the like, these rigid containers have many drawbacks.

Because they are rigid in dimension, they must be unusually strong to withstand the physical stress due to shifts in their liquid contents. This is particularly true with the large volume of from 5 to 20 liters preferred in accordance with this invention. In addition, their fixed, heavy construction makes them unatten economical to transport unless filled. Even when empty, they occupy their full volume. Therefore, they are desirably produced close to the site of filling and used only once.

This invention makes possible the provision of light, pouches or like flexible containers for the packaging of similar volumes of liquid material. The flexibility of these films—even in container form—permits much of the physical stress due to shifts in liquid contents to be absorbed through movement of the container wall. This permits the containers to be composed of material of significantly lower strength and weight than those employed in rigid containers.

In addition, the containers formed of the present films can be compressed into essentially flat form when empty. This greatly facilitates their storage, transport and reuse.

The films of this invention are composed of four essential layers or laminated plies. These layers are (in order, from the outside to the inside of a packaging wall):

(1) balanced biaxially-oriented polyamide;
(2) flexible metal foil;
(3) balanced biaxially-oriented polypropylene; and
(4) heat-sealable polyolefin.

When affixed together, preferably through the use of various sealers and adhesives, these four layers produce a composite, laminate film of unusually high strength and flex-resistance.

The outermost layer of this film is composed of polyamide which has been biaxially-oriented. By being biaxially-oriented in essentially balanced degree, this layer provides substantial flex-crack resistance. In addition, the balanced biaxial orientation of the nylon yields a strong resistance to burst or tearing.

This layer, which may be composed of essentially any of the polyamides known in the art, although nylons are particularly preferred. It is necessary only that they have been stretched to provide a balanced biaxial orientation. This layer may be provided in a thickness of from 0.0003 to 0.003 inch, preferably about 0.0006 inch. Such a thickness provides a strong outer covering to the present composite, packaging films.

The second, essential layer may be composed of any of the flexible metal foils known in the art. These foils—such as lead, copper, and preferably aluminum—are ordinarily from 0.0002 to 0.002, preferably about 0.00035 inch in thickness. In addition to providing excellent protection from ultra-violet light, these films have a high resistance to vapor penetration and provide an excellent barrier to penetration of liquid, particularly water or moisture, through the film.

The third essential layer comprises balanced biaxially-oriented polypropylene. This is also a highly flex-/crack resistant material. It may be composed of any of the polypropylenes known in the art and which have been stretched to produce the desired balanced, biaxial-orientation.

This biaxial polypropylene layer may have a thickness of from 0.0003 to 0.002, preferably about 0.0005 inch. As such, it additionally acts as a highly inert barrier which protects and restrains the contents of the eventual pouch.

The fourth and innermost essential layer of this invention is composed of heat-sealable polyolefin. This olefin layer may be composed, for example, of polyethylene or polypropylene (preferably of medium density) and provides a barrier through which the present films may be sealed to produce pouch-like containers. This layer should be provided at a thickness of from 0.001 to 0.004, preferably about 0.002 inch. In this manner, ready sealability, as well as substantial contribution to the impermeability of the film as a whole is obtained.

Although virtually any heat-sealable polyolefin may be utilized herewith, highly temperature resistant polyolefin, particularly polyethylene is preferred. Thus, for example, medium density polyethylene having a melting point of from about 70° to 90° C. so as to permit its hot fill application to the film at temperatures of from about 85° to 95° C. is preferred.

The unique physical characteristics of this film are believed partially attributable to the instant provision of balanced, biaxial polymer layers on both sides of the metal foil. Metal foils are particularly susceptible to cracking and pinhole breaks incident to flex. The present arrangement of different balanced biaxially-oriented polymers on the sides of the foil, however, is believed to allow cooperation which protects this sandwiched metal foil so as to increase its resistance to flexing and extend the useful life of the film.

By whatever mechanism, however, the present films possess exceptional physical characteristics which permit their substitution for the substantially stronger materials employed in prior art rigid containers. Also, they solve the major problem which has heretofore limited the utility of flexible films. The films of this invention successfully resist the cracking of foil and rupture of laminate which have accompanied past attempts to package substantial volumes of liquid in non-rigid containers.

In addition to these four essential layers of the present film, certain optional layers or treatments have been discovered further to enhance its strength and durability. These additional layers or treatments may be utilized, either individually or in combination, further to improve the characteristics of the present packaging films.

One optional layer is a primer coat which may be applied to the internal surface of the biaxially-oriented polyamide layer. This layer, which is preferably from about 0.00005 to 0.0002 inch in thickness, improves the internal film adhesion to the nylon layer. It may be composed of any of the primers known in the art, but most desirably comprises a polyethylene imine.

A second layer desirably interposed between the balanced biaxially-oriented nylon and the metallic foil comprises a conventional adhesive resin. This resin, which desirably is from about 0.0003 to 0.001 inch in thickness, should directly contact the metal foil to provide improved adhesion thereto. The resin is preferably an ethylene acrylic acid polymer and most preferably is utilized in conjunction with the aforementioned primer for the biaxially-oriented nylon.

On the other side of the metallic foil (and between the metallic foil and the biaxially-oriented polypropylene) there is desirably provided a vinyl washcoat on the inner surface of the foil. This coat, which most desirably is in the thickness of from about 0.00005 to 0.0002 inch, increases the chemical resistance of the foil so as further to improve its barrier characteristics.

An adhesive resin coating is also preferred between the aluminum foil and the balanced biaxially-oriented polypropylene. This coating, which is preferably a urethane polymer provided in the thickness of from 0.00005 to 0.0002 inch, should directly contact the biaxially-oriented polypropylene so as to improve the adhesion of the film layers. Most preferably, this adhesive is utilized in combination with the aforementioned vinyl washcoat for the aluminum foil.

Still a further layer of adhesive resin is preferably provided between the balanced biaxially-oriented polypropylene and the heat-sealable polyolefin layer. This resin is also preferably composed of polyurethane in a thickness of from about 0.00005 to 0.0002 inch. Again it contributes to the internal film adhesion by providing lamination.

It is also desirable to treat various of the layer surfaces further to improve the adhesion and integrally of the present film. The balanced biaxially-oriented polypropylene layer, for example, is preferably treated on at least one surface to reduce its slip characteristics. This may be accomplished in conventional fashion by, for instance, application of an anti-slip agent. Further improvement in the film may be obtained by subjecting the internal film surfaces of the polyamide and polyolefin layers to corona discharge.

The layers of this invention, whether or not including one or more of the optional layers of this invention, may readily be laminated to form the present composite, packaging films. This lamination may be performed by any of the means well-known in the art. A particular sequence of lamination is preferred, however, because it greatly facilitates manufacture of tightly adherent, high strength films.

This preferred sequence of lamination involves the production of two sub-laminates which may then be adhered together to produce films of the present invention.

The first sub-laminate is composed of affixed layers of balanced biaxially-oriented polyamide and metallic foil. Most desirably, this sub-laminate is produced by extruding a layer of adhesive resin, such as ethylene acrylic acid polymer, between these two preformed, essential layers. This produces a sandwiched material of high strength.

It is further preferred that, preliminary to the extrusion lamination, the biaxially-oriented polyamide be treated by corona discharge so as to improve the adhesion to the aluminum foil. In addition, if a primer coat is to be provided in the laminate, this coating should be applied directly to the polyamide, or corona-treated polyamide surface, prior to extrusion.

If the composite, packaging is also to include the preferred washcoat over the inner metallic foil surface, this coat may be applied to the first sub-laminate at any time prior to or following extrusion. It is preferred, however, that it be coated onto the metallic foil after formation of the sub-laminate.

The second sub-laminate is composed of the balanced biaxially-oriented polypropylene and heat-sealable layers. These two layers are affixed together—preferably through application of a resin adhesive—to form the sub-laminate. Still further to improve the adherence between these two layers, it is preferred that the polyolefin internal film surface be subjected to corona discharge and the biaxial polypropylene surfaces treated with an anti-slip agent before they are affixed together.

After formation of the two sub-laminates, they may be joined together by application of heat and pressure. Again, the integrity of the composite, packaging film is improved if an adhesive, such as polyurethane polymer, is coated on one or both of the surfaces to be joined preparatory to the application of heat and pressure.

BRIEF DESCRIPTION OF THE DRAWINGS

The subject matter of the present invention is more completely described by reference to the accompanied drawings wherein.

DESCRIPTION OF THE DRAWINGS

Figure 1:
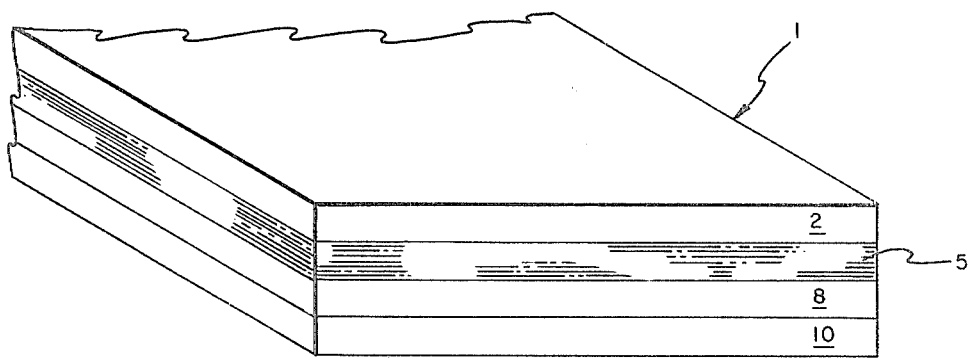
FIG. 1 is a side view showing the film of the present invention having only its four, essential film layers.
Figure 2:
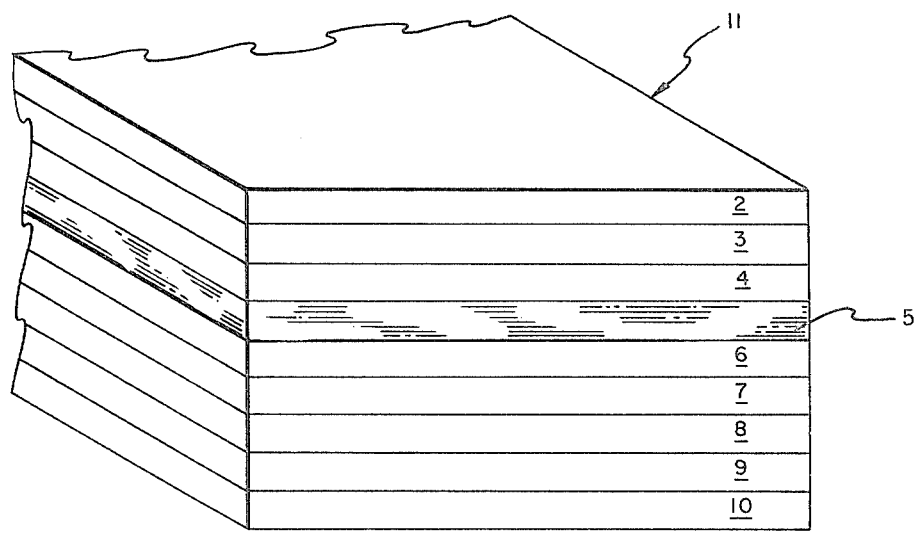
FIG. 2 is a side view showing a film of the present invention which includes both the four essential layers and the various optional layers therefor.

With reference to FIGS. 1 and 2, composite, packaging films of the present invention are depicted as laminates 1 and 11, respectively. In FIG. 1, only the essential layers of this invention are disclosed, these layers being an outside layer of balanced biaxially-oriented polyamide 2, a metal foil 5, a layer of balanced biaxially-oriented polypropylene 8 and a layer of heat-sealable polyolefin 10.

The packaging film 11 depicted in FIG. 2 depicts both the essential layers (also shown in FIG. 1) and various optional layers already described herein. These essential layers 2, 5, 8 and 10 are of the same compositions as previously described with respect to FIG. 1. In addition, however, there is depicted a primer coat 3; and a layer of adhesive resin 4; a vinyl washcoat 6; and two additional layers of adhesive resin 7 and 9.

Figure 3:
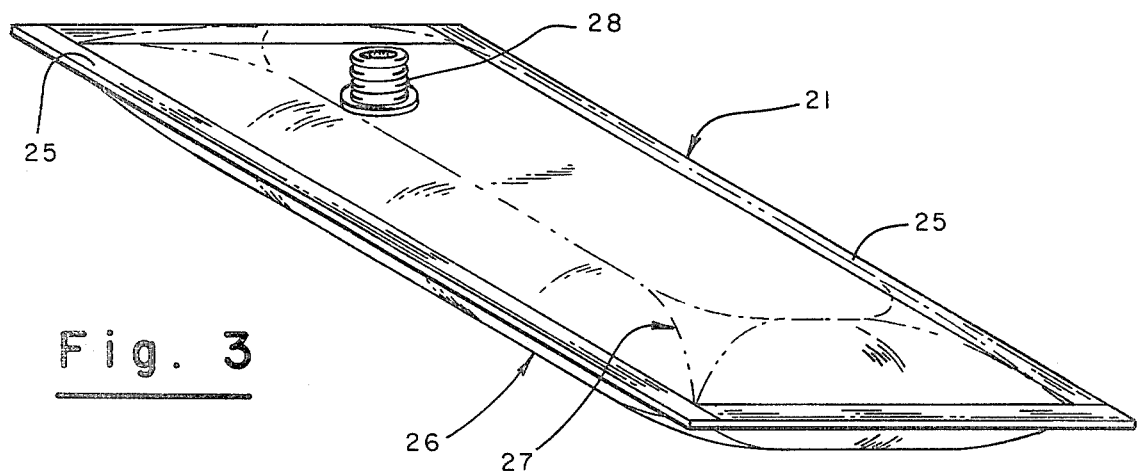
FIG. 3 is a plain view showing a pouch composed of the packaging film of the present invention.

With reference to FIG. 3, there is illustrated a pouch formulated from two composite, packaging films of this invention. The pouch 21 is composed of the two separate packaging films 26 and 27 (shown in expanded form as it would exist if the pouch were filled). The perimeter of the pouch 21 is indicated to comprise a sealed perimeter portion 25 (composed of joined layers 26 and 27) by which the contents of the pouch are defined. A screw top spigot 28, is located in the surface of one film 27 as a means for filling and emptying the pouch of its liquid contents.

Figure 4:
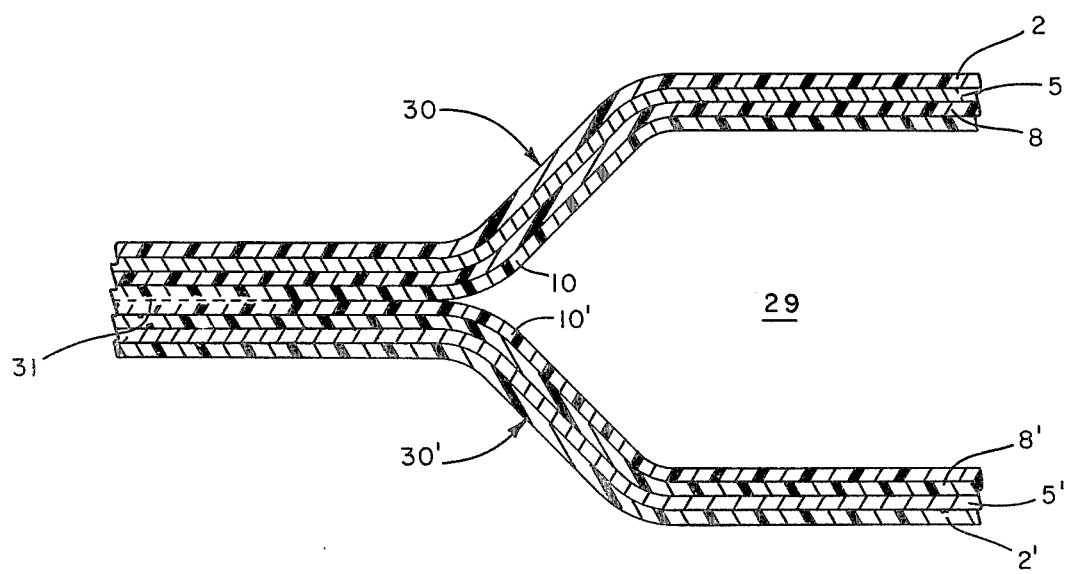
FIG. 4 is a partial cross-sectional view of a pouch composed of two adherent packaging films of the present invention.

FIG. 4 illustrates a cross-sectional view of a portion of the pouch of FIG. 3. This disclosed portion represents the perimeter and partially interior view of the pouch walls. The opening 29 within the pouch shows a degree of expansion of the pouch within which the liquid contents would be held. Also shown is the orientation of the two packaging films 30 and 30' so that two separate film layers of heat-sealable polyolefin 10 and 10 are contingent and bondable, one to the other, so as to form a single, double thickness of heat-sealed polyolefin 31 at the perimeter of the pouch. The remaining layers 2, 5 and 8 of film 30 and 2', 5' and 8' of film 30' are of the same compositions as previously described with respect to FIG. 1.

The pouch depicted in FIG. 3 in plain view and in FIG. 4 in cross-section is formed from two of the packaging films of the present invention. These pouches are conveniently prepared by laying one sheet directly over the other and applying heat and pressure only about the outer perimeter of the overlapping films so as to form a heat-sealed joint surrounding the pouch. In this manner, and particularly if as depicted in FIG. 3 a spout or like device has been placed in the body of one of the two films at a distance spaced from the peripheral, heat-sealed edges, an enclosed pouch or package having a single closeable opening is produced. This pouch permits easy transportation in compressed form and ready filling with a liquid material which expands at the opening remaining within the pouch.

In an alternate embodiment, now shown, a pouch similar to that depicted in FIGS. 3 and 4 may be formed from a single sheet of film. Thus, a single sheet of film may be folded 180° at its mid-point and then heat-sealed at its outer perimeter to form a unitary pouch. It will differ from the pouch of FIG. 3 in that one of its edges will be of folded construction.

Certain changes or modifications in the practice of the present invention can be readily entered into without substantially departing from the intended spirit and scope. Therefore, it is to be fully understood that the invention is not to be limited or in any way restricted by the preferred embodiments and the drawings in the foregoing specification. Rather, the scope of this invention is to be interpreted and construed in the light of what is set forth and delineated in the appended claims.

I claim:

1. A composite, flexible packaging film comprising essentially a first layer of balanced biaxially-oriented polyamide, providing substantial flex crack resistance affixed to one side of a second layer of flexible metal foil and a third layer of balanced biaxially-oriented polypropylene, also providing substantial flex crack resistance affixed to the opposite side of said foil and to a fourth layer of heat-sealable polypropylene.

2. The film of claim 1, wherein the polyolefin layer comprises medium density polypropylene.

3. The film of claim 1, wherein the foil is provided with a vinyl washcoat on the side adjacent the first balanced biaxially-oriented polyamide layer and is affixed to said polyamide layer through a layer of adhesive resin.

4. The film of claim 3, wherein the adhesive resin comprises polyurethane.

5. The film of claim 1, wherein the first balanced biaxially-oriented polyamide layer is provided with a primer coat of polyethylene imine on the side adjacent the metal foil and is affixed to said foil through a layer of adhesive resin.

6. The film of claim 5, wherein the adhesive resin comprises ethylene vinyl acetate copolymer.

* * * * *